US011155675B2

(12) United States Patent
Nodari et al.

(10) Patent No.: US 11,155,675 B2
(45) Date of Patent: Oct. 26, 2021

(54) METHOD OF REGIOSELECTIVE SYNTHESIS OF POLYESTERS FROM ASYMMETRIC DIOLS

(71) Applicant: versalis S.p.A., San Donato Milanese (IT)

(72) Inventors: Mirco Nodari, Guidizzolo (IT); Aldo Longo, Mantova (IT); Martino Colonna, Bologna (IT); Claudio Gioia, Imola (IT)

(73) Assignee: versalis S.p.A., San Donato Milanese (IT)

( * ) Notice: Subject to any disclaimer, the term of this patent is extended or adjusted under 35 U.S.C. 154(b) by 210 days.

(21) Appl. No.: 16/316,839

(22) PCT Filed: Jul. 26, 2017

(86) PCT No.: PCT/IB2017/054542
§ 371 (c)(1),
(2) Date: Jan. 10, 2019

(87) PCT Pub. No.: WO2018/020440
PCT Pub. Date: Feb. 1, 2018

(65) Prior Publication Data
US 2020/0181319 A1    Jun. 11, 2020

(30) Foreign Application Priority Data
Jul. 27, 2016    (IT) .................. 102016000078950

(51) Int. Cl.
*C08G 63/16*    (2006.01)
*C08G 63/87*    (2006.01)

(52) U.S. Cl.
CPC ............. *C08G 63/16* (2013.01); *C08G 63/87* (2013.01)

(58) Field of Classification Search
CPC ......... C08G 63/16; C08G 63/87; C08G 63/82
See application file for complete search history.

(56) References Cited

U.S. PATENT DOCUMENTS

| 5,962,624 | A | 10/1999 | Vonderhagen et al. |
| 7,211,634 | B1* | 5/2007 | Martin ................. C08G 63/199 526/66 |
| 2005/0227100 | A1 | 10/2005 | Brandenburger et al. |
| 2009/0292068 | A1 | 11/2009 | Brandenburger et al. |
| 2011/0237757 | A1 | 9/2011 | East et al. |
| 2011/0257346 | A1 | 10/2011 | Jaffe et al. |
| 2016/0369046 | A1 | 12/2016 | Jaffe et al. |
| 2017/0210750 | A1 | 7/2017 | East et al. |

FOREIGN PATENT DOCUMENTS

| JP | 46-4970 | 11/1971 |
| JP | 9-508425 | 8/1997 |
| JP | 2001-5143320 A | 9/2001 |
| RU | 2 541 564 C2 | 8/2013 |
| WO | 95/20616 A1 | 8/1995 |
| WO | WO 1998/055642 A2 | 12/1998 |
| WO | WO 2004/016426 A1 | 2/2004 |
| WO | WO 2011/116270 A1 | 9/2011 |

OTHER PUBLICATIONS

Longo, J. et al.; Journal of the American Chemical Society, 2014, vol. 136, p. 15897-15900.*
Yoon, K.R. et al.; Synthetic Communications, 2012, vol. 42, p. 3504-3512.*
Kobayashi, S.; Proceedings of the Japan Academy, 2010, vol. 86, p. 338-365.*
Bruckner, Organic Mechanisms: Reactions, Stereochemistry and Synthesis, 2010, p. 268-270.*
Gross, R.A., et al., "Polymer Synthesis by In Vitro Enzyme Catalysis", NSF IUCRC for Biocatalysis and BioProcessing of Macromolecules, Chemical Reviews, 2001, vol. 101 No. 7, pp. 2097-2124.
International Search Report and the Written Opinion of the International Searching Authority dated Dec. 14, 2017 in PCT/IB2017/054542 filed Jul. 26, 2017, 13 pages.
Richard A. Gross, et al., "Enzyme-Catalysis Breathes New Life Into Polyester Condensation Polymerizations" Trends in Biotechnology, Elsevier, Publications, Cambridge, GB, vol. 28, No. 8, XP027151227, Aug. 1, 2010, pp. 435-443.
Pietro Cesti, et al., "Preparative Regioselective Acylation of Glycols by Enzymatic Transesterification in Organic Solvents" Applied Biochemistry and Biotechnology; Part A: Enzyme Engineering and Biotechnology, Humana Press Inc., New York, vol. 11, No. 5, XP035176891, Oct. 1, 1985, pp. 401-407.
Office Action dated Oct. 22, 2020 in corresponding Japanese Patent Application No. 2019-503693, 2 pages.
Office Action dated May 10, 2021, in Japanese Patent Application No. 2019-503693 filed Jul. 26, 2017 (with English translation).

* cited by examiner

*Primary Examiner* — Robert S Jones, Jr.
(74) *Attorney, Agent, or Firm* — Oblon, McClelland, Maier & Neustadt, L.L.P.

(57) ABSTRACT

A method for synthesizing regioregular polyesters, starting from asymmetric diols, may provide the polymer ordered structure and advantageous physical-chemical properties. Such methods can make it is possible to obtain regioregular polyesters having high glass transition temperatures $T_g$ and crystalline properties. In the case in which the asymmetric diols are used in a pure enantiomeric form, with respect to the chiral carbon bound to the secondary hydroxyl, through the above-mentioned method it is possible to obtain regioregular and stereoregular polyesters, which may have thermal and crystalline properties further ameliorative with respect to non-chiral regioregular polymers.

20 Claims, 3 Drawing Sheets

METHOD OF REGIOSELECTIVE SYNTHESIS OF POLYESTERS FROM ASYMMETRIC DIOLS

CROSS-REFERENCE TO RELATED APPLICATIONS

The present application is the national stage of international application PCT/IB2017/054542, filed on Jul. 26, 2017, and claims the benefit of the filing date of Italian Appl. No. 10 2016 000 078 950, filed on Jul. 27, 2016.

FIELD OF THE INVENTION

The present invention belongs to the field of polymer synthesis.

In particular, the present invention relates to a method of synthesis of regioregular polyesters, wherein the polymer ordered structure provides them with advantageous physicochemical properties, starting from asymmetric diols comprising at least a primary hydroxyl and at least a secondary hydroxyl.

More particularly, by the method of the present invention it is possible to obtain regioregular polyesters having high glass transition temperatures $T_g$ and crystalline properties.

BACKGROUND OF THE INVENTION

In the case that the asymmetric diols are used in a pure enantiomeric form, with respect to the chiral carbon bound to the secondary hydroxyl, through the above-mentioned method it is possible to obtain regioregular and stereoregular polyesters, characterized by thermal and crystalline properties further ameliorative with respect to non-chiral regioregular polymers.

The synthesis processes of polyesters wherein asymmetric diols are used, alone or in mixture with symmetric diols, wherein the glass transition temperature $T_g$ and the possible presence of a crystalline phase depend on the order degree of the polymeric structure, are described in bibliography.

For example, the patent application WO 2004/016426 A1 discloses a polyester resin, used for the coil coating, obtained by polycondensation of at least one aromatic dicarboxylic acid (for example, isophthalic acid) and a mixture of symmetric and asymmetric diols, wherein the part of symmetric diols is prevalent. The above-mentioned resin, characterized by a glass transition temperature $T_g$ of about 35-40° C., in accordance with its amorphous structure, constitutes a substrate of durable coating and, however, easily workable. However, the described polycondensation reaction, catalysed by organotin (for example, dibutyltin oxide) is not regioselective, and only the accurate selection of symmetric and asymmetric diols in the right proportion allows the obtainment of polymers having the properties of stability to UV rays and durability suitable to the scopes and applications of WO 2004/016426 A1.

On the contrary, U.S. Pat. No. 3,321,437 discloses linear polyesters, deriving from the condensation of asymmetric diols with symmetric carboxylic acids, characterized by a certain crystallinity degree, detectable by X ray diffraction, solid state birefringence and which can subject a phase transition of the first order. The crystalline linear polyesters described in U.S. Pat. No. 3,321,437 show to tolerate high room temperatures or the attack of organic solvents better than the corresponding amorphous polymers, in terms of dimensional stability.

The synthesis reactions of the polyesters object of U.S. Pat. No. 3,321,437 are statistical polycondensations, carried out at high temperature (always higher than 140° C.), possibly in the presence of organometallic catalysts (for example, titanium butoxide).

Also in this case, the reaction is not regioselective and the structure of the final polyesters is random, regiochemically irregular. Without being bound to any theory, the crystallinity showed by these polyesters is therefore probably due to the fact that both the dicarboxylic acids and the asymmetric diols, these latter exclusively having primary alcohol functions, are all of aromatic nature.

It is therefore evident that, in order to obtain polyesters having ordered structure, especially in the absence of aromatic rings in the chain, it is appropriate being able to control the regioselectivity of the polycondensation reaction.

In this respect, WO 2011/116275 discloses asymetrically substituted bisanhydrohexytol derivatives (for example, isosorbide), used for the preparation of homopolymers or polyesters which show semi-crystalline properties.

In order to preserve the regioregularity of the condensation product, the preparation process of these intermediates involves a protection step of one of the two alcohol functions present on the molecule of the bisanhydrohexytol derivative, so as to direct the formation reaction of the ester on one of the hydroxyls at a time.

Following an alternative approach, Ishihara et al. (in Ishihara K., Kurihara, H., Yamamoto, H., "An extremely simple, convenient, and selective method for acetylating primary alcohols in the presence of secondary alcohols" (1993), *J. Org. Chem.*, vol. 58, pages 3791-3793) disclosed a method for the selective acylation of primary alcohol function which does not involve the possible secondary alcoholic function, present on the same molecule or separately in two separate molecules. In fact, through such reaction it is possible to selectively acylate the primary hydroxyl of asynunetric diols also comprising a secondary hydroxyl on its own molecule. A drawback of this reaction relates the need to work at very low temperatures (from −40° C. to −78° C.) ad in the presence of amines with high steric hindrance.

More recently, enzyme catalysts with high catalytic efficiency were used for the formation or hydrolysis of ester bonds at mild reaction conditions.

For example, A. M. Klibanov (in "Asymmetric Transformation Catalyzed by Enzymes in Organic Solvents" (1990), *Acc. Chem. Res.*, vol. 23, pages 114-120) discloses several reactions, such as, for example, the asymmetric esterification and transesterification, the racemic alcohol resolution, the regioselective acylation of glycols, by means of hydrolase enzymes, such as lipases. Also P. Cesti et al. (in P. Cesti, A. Zaks, A. M. Klibanov, "Preparative Regioselective Acylation of Glycols by Enzymatic Transesterification in Organic Solvents" (1985) *Appl. Biochem. Biolechnol.*, vol. 11, pages 401-407) demonstrated the capability of the porcine pancreatic lipase to catalyse the regioselective monoacylation of several glycols into ethyl carboxylates, used both as solvents and as acylating agents. In particular, it was possible to demonstrate that the lipase enzyme is extremely effective when used in a reaction of transesterification. For example, contacting ethyl acetate and 1,2-butandiol, after 23 hours 97% of diol is acetylated and the resulting product is peculiarly only the monoester. Even more surprisingly, the porcine pancreatic lipase exclusively acetylates only the primary hydroxyl present on the diol molecule.

Lipases of different origin seem to maintain this advantageous characteristic. For example, U.S. Pat. No. 5,962,624 discloses a process for producing linear polyesters from polyols comprising at least two primary alcohol groups and at least one secondary alcohol group and from dicarboxylic acids or esters, in the presence of lipase from organisms of the genus *Candida* spp., *Rhizopus* spp., *Penicillium* spp., and others. In this case, the use of the enzyme allows to avoid the functionalization of the secondary hydroxyls: the obtainable linear polyester can be used as thickener or softening in the formulation of cosmetic and the like.

BRIEF SUMMARY OF THE INVENTION

The Applicant has now found a method to obtain regioregular polyesters, or even stereoregular regioregular polyesters, having an ordered structure, from asymmetric diols comprising a primary alcoholic function and a secondary alcoholic function and bifunctional acylating compounds, comprising two steps.

The synthesis of a regioregular stable intermediate constituted by two units of said asymmetric diol and one unit of a symmetric dicarboxylic acid is obtained in the first step by using an enzymatic catalyst.

In the second step, said regioregular stable intermediate is used in a reaction of polycondensation with a bifunctional, preferably symmetric, acylating compound.

The regioregular polyester thus obtained, on equal terms of molecular weight, shows physicochemical properties different with respect to the homologues polyesters having a non-ordered structure, synthesized by single step polycondensation, having a higher value of glass transition temperature and partial crystallinity.

In particular, in case of using pure enantiomers of asymmetric diols in the reaction of step a), it is possible to obtain stereoregular regioregular polyesters further ordered and characterized by glass transition temperatures $T_g$ and melting temperatures of the possible crystalline phase higher than those of the corresponding non-chiral regioregular polyesters.

DETAILED DESCRIPTION OF THE DRAWINGS

It is important to note that the use of two reaction steps further allows to control the sequence of the dicarboxylic units in the case in which the dicarboxylic derivatives used in the two synthesis steps of the polyester are different: in fact, in this case the method according to the invention guarantees the perfect alternation of the monomer units characterized by two different carboxylic groups along the chain, increasing the overall order degree of the polymer obtained, where a statistical polyester would have a random sequence of such units.

Therefore, the above-mentioned method allows to obtain, by applying a simple and sustainable process, ordered polyesters with a controlled regioregularity, wherein it is possible to control and modify the physicochemical properties of the end-product.

Further characteristics and advantages of the present invention will be evident from the following detailed description.

For a better understanding of the characteristics of the process object of the present invention, reference will be made to the figures of the attached drawings which have a purely illustrative and non-limiting purposes.

Figure 1A:
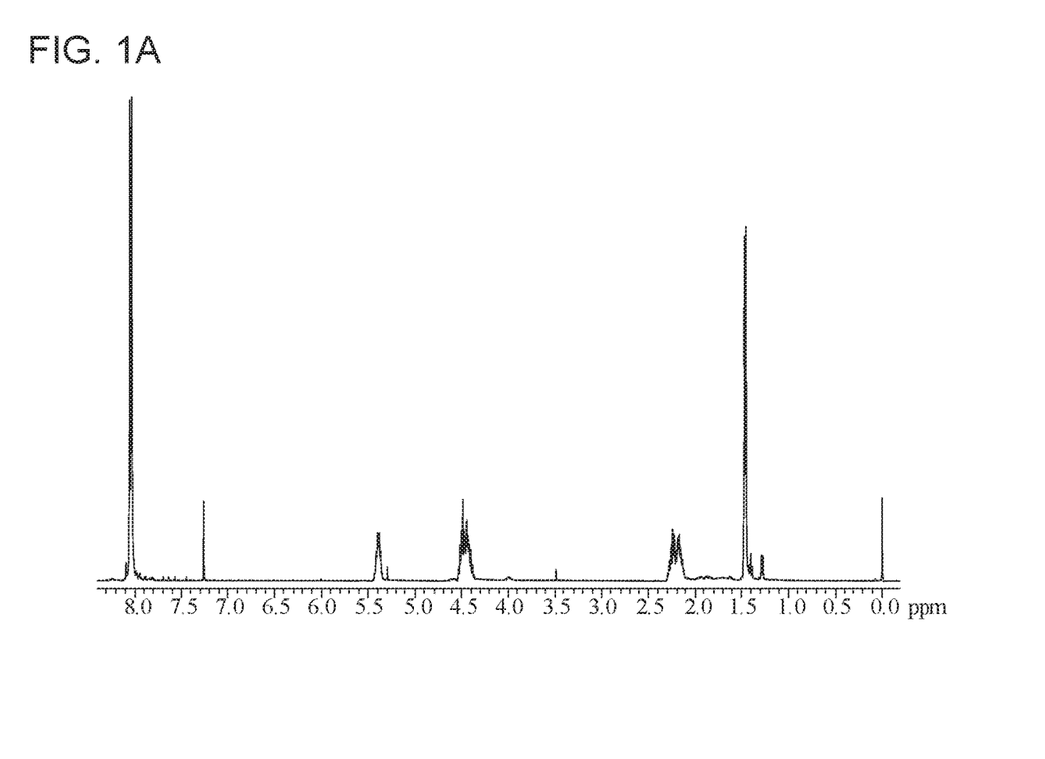
FIG. 1A shows the complete $^1$H-NMR spectrum of a regioregular polyester obtained from 1,3-butandiol and terephthalic acid as monomer units by the two-steps synthesis claimed in the present invention.
Figure 1B:
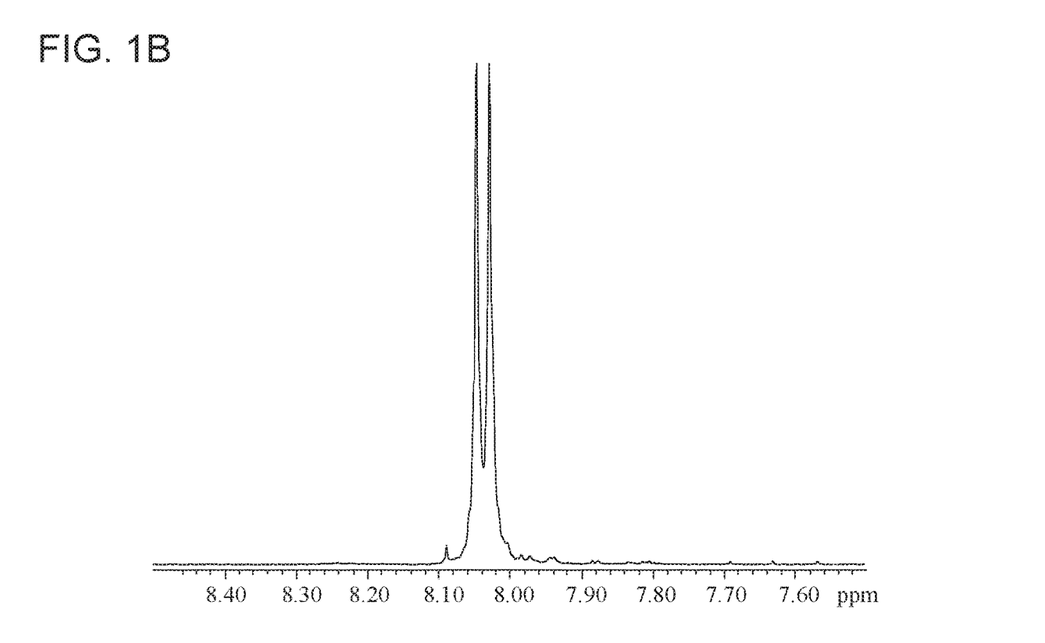
FIG. 1B shows an enlargement on the zone of the aromatic signals from FIG. 1A used in the assessment of the polyester regioregularity.

In particular, the $^1$H-NMR spectrum of a regioregular polyester obtained from 1,3-butandiol and terephthalic acid as monomer units by the two-steps synthesis claimed in the present invention, as described in example 14, is reported in FIGS. 1A and 1B: in particular FIG. 1A shows the complete spectrum, while FIG. 1B shows an enlargement on the zone of the aromatic signals used in the assessment of the polyester regioregularity.

Figure 2A:
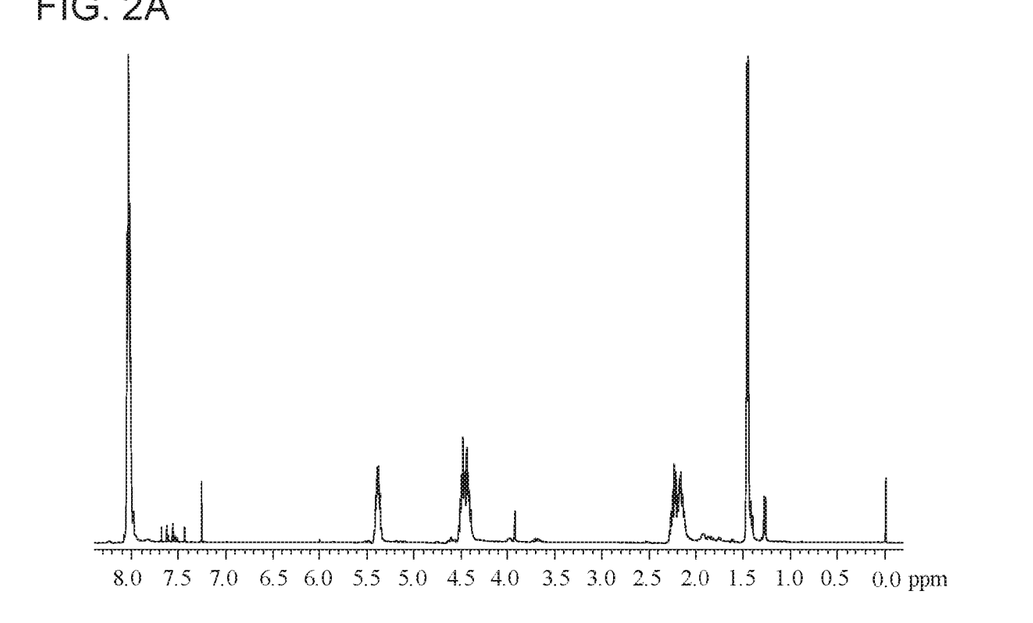
FIG. 2A shows the complete $^1$H-NMR spectrum of a statistical polyester obtained from 1,3-butandiol and terephthalic acid as monomer units by the single-steps polycondensation, as described in comparative example 15 spectrum.
Figure 2B:
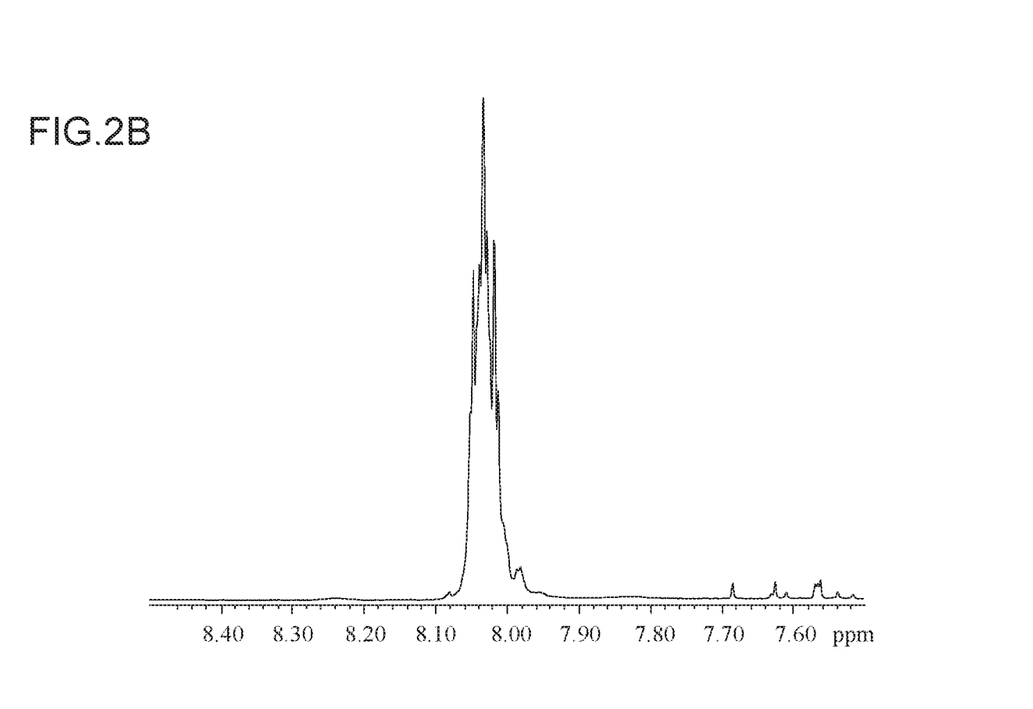
FIG. 2B shows an enlargement on the zone of the aromatic signals used in the assessment of the polyester regioregularity from FIG. 2A.

The $^1$H-NMR spectrum of a statistical polyester obtained from 1,3-butandiol and terephthalic acid as monomer units by the single-steps polycondensation, as described in comparative example 15, is reported in FIGS. 2A and 2B: in particular, FIG. 2A shows the complete spectrum, while FIG. 2B shows an enlargement on the zone of the aromatic signals used in the assessment of the polyester regioregularity.

Figure 3:
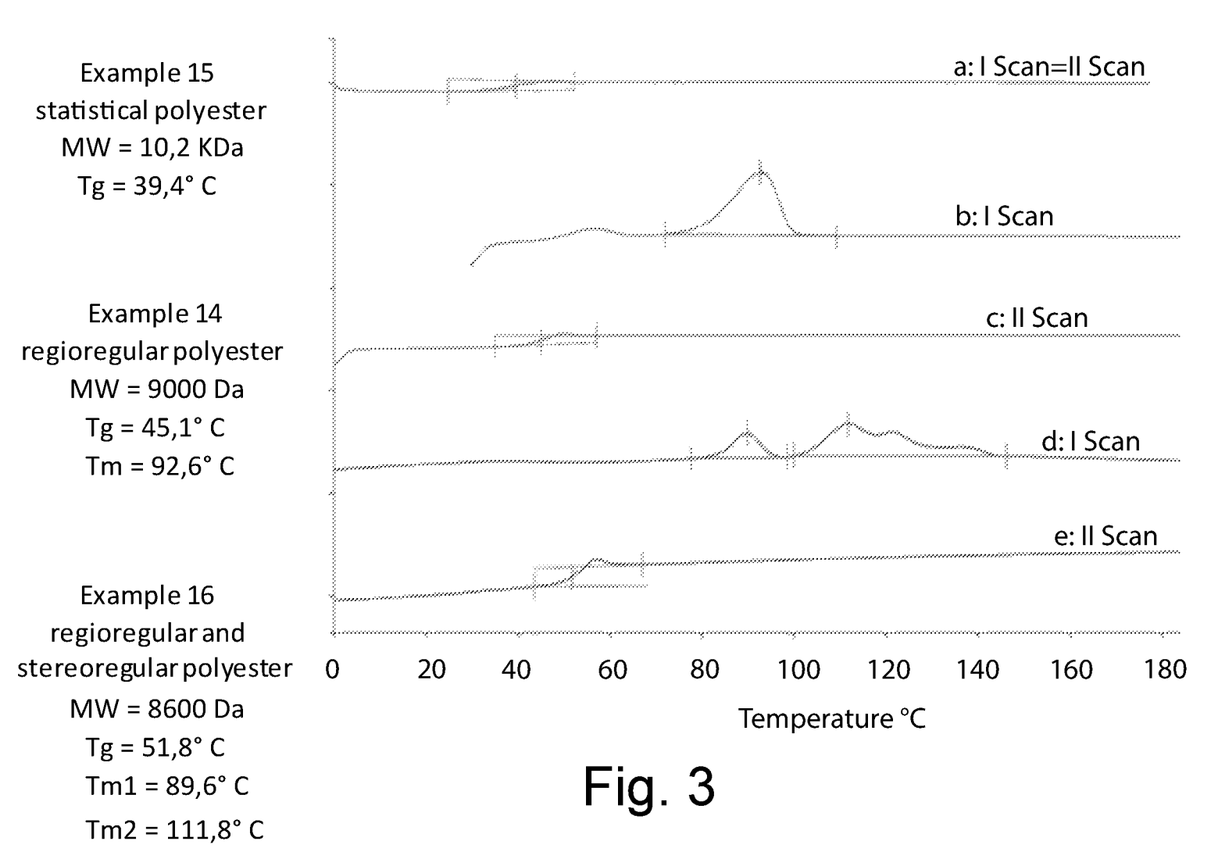
FIG. 3 shows the DSC profiles of samples of polyester obtained as described in comparative Example 15 (profile a), Example 14 (profiles b and c) and Example 16 (profiles d and e).

The DSC profiles of samples of polyester obtained as described in comparative example 15 (profile a), example 14 (profiles b and c) and example 16 (profiles d and e), are reported in FIG. 3.

For the aims of the present description and the following claims, the definitions of the number ranges always comprise the end-points, unless otherwise specified.

In the description of the embodiments of the present invention, the use of the terms "comprising" and "containing" indicates that the options described, for example relating to the steps of a method or a process or the components of a product or a device, are not necessarily exhaustive. However, it is important to note that also the embodiments wherein the term "comprising" referred to the options described, for example relating to the steps of a method or a process or the components of a product or a device, is to be interpreted as "consisting essentially of" or "which consists of" also if not explicitly declared, are objects of the present invention.

For the aims of the present description and the following claims, the percentages are always percentages by weight, except wherein otherwise specified.

For the aims of the present invention, the term "monomer unit" means the repeating structural unit forming the polymer. In particular, the dicarboxylic monomer units and the asymmetric diol monomer units recurring in the polyesters of the present invention are distinguished by the presence of, alternatively, two carboxylic functions, free or in the esterified form, or two alcohol functions, of which one is primary and one is secondary.

For the aims of the present invention, term "regioregularity", as referred herein to a polyester or a stable intermediate, means the excess molar percentage of dicarboxylic monomer units in the polyester or in the stable intermediate (with respect to the total of bonded dicarboxylic monomer units) that are bonded with both the carboxylic groups either to a primary alcohol function or to a secondary alcohol function of asymmetric diol monomer units having a primary alcohol function and a secondary alcohol function on the same unit.

For the aims of the present invention, the term "statistic polyester" means a polymer wherein the sequence of the monomer units in the chain follows the laws of statistics (Jenkins, A. D., Kratochvil, P., Stepto, R. F. T., Suter, U. W. "Glossary of basic terms in polymer science (IUPAC Recommendations 1996)" (1996), *Pure & Appl. Chem.*, vol. 68, pages 2287-2311).

For the aims of the present inventions, the term "regioregular polyester" means an ordered polymer structure obtained by polycondensation of a regioregular stable intermediate diol with a bifunctional acylating agent, characterized by the fact that it has a regioregularity (as previously defined) higher than 50%, i.e., more than 75% of their dicarboxylic monomer units are bound to two asymmetric diol monomer units by ester bonds in a regular and ordered way so that both carboxylic groups of the dicarboxylic monomer unit are bonded exclusively to the primary alcohol function or exclusively to the secondary alcohol function. Preferably, the regioregular polyesters of the present invention have a regioregularity of at least 80%, more preferably of at least 95%, even more preferably, from 97% to 100%.

For the aims of the present inventions, the term "stereoregular polyester" means an ordered polymer structure in which all the asymmetric carbons present in the diol monomer units are in the same configuration.

The present invention relates to a method of synthesis of a regioregular polyester comprising the following steps:
a) reacting under stirring an asymmetric diol comprising a primary alcohol function and a secondary alcohol function with a symmetric dicarboxylic acid, or a symmetric dicarboxylic acid ester, in the presence of an enzymatic catalyst belonging to the category of the lipases, thus obtaining a regioregular stable intermediate
b) reacting the regioregular stable intermediate obtained in step a) with a bifunctional acylating agent, thus obtaining the regioregular polyester.

According to the present application, said regioregular stable intermediate obtained in said step a) of the present invention is the product of reaction of a symmetric dicarboxylic acid or a symmetric dicarboxylic acid ester with an asymmetric diol as previously defined, wherein the carboxylic function, in the presence of a lipase enzyme, reacts prevailingly or essentially with the primary alcohol function of the diol in such a way as to have a regioregularity of at least 50%, preferably of at least 80%, more preferably of at least 95%, even more preferably, from 97% to 100%. Said regioregular stable intermediate comprises normally one dicarboxylic monomeric unit bound to the alcohol function of two asymmetric diol monomeric unit. Depending on the regioregularity of the intermediate, the bonded alcohol function are proportionally of the primary type. When the regioregularity of the stable intermediate is 100%, each carboxylic function of said symmetric dicarboxylic acid, or of said symmetric dicarboxylic ester, is bound by ester bonds to the primary alcohol function of the asymmetric diol.

The asymmetric diol comprising a primary alcohol function and a secondary alcohol function used in step a) of the method according to the present invention may contain a chiral centre. For the aims of the present method, said diol can be equally used as pure enantiomer or in the racemic form. In a preferred aspect, when the asymmetric diol comprising a primary alcoholic function and a secondary alcoholic function used in the step a) of the method contains a chiral centre, said asymmetric diol can be in the enantiopure form. In a further preferred aspect, said asymmetric diol can be in a mixture wherein the enantiomeric form (equally right-handed or left-handed) prevails on the other, or in the form of racemic mixture of the two optical isomers.

Suitable asymmetric diols according to step a) of the process of the present invention have from 3 to 10 carbon atoms, preferably from 4 to 6 carbon atoms. Besides oxygen, other heteroatoms may also be present in the diol molecule.

In a preferred aspect, the asymmetric diol comprising a primary alcohol function and a secondary alcohol function used in step a) has general formula (I):

wherein R can be an alkylene $C_1$-$C_4$ and $R_1$ can be a $C_1$-$C_4$ alkyl. Preferably R is a $C_1$-$C_4$ linear alkylene, even more preferably a $C_1$-$C_2$ linear alkylene and $R_1$ is a $C_1$-$C_4$ linear alkyl.

Specific examples of asymmetric diols comprising a primary alcohol function and a secondary alcohol function particularly useful for the aim of the present invention are: 1,2-propanediol, 1,3-butanediol, 1,2-pentanediol, 1,3-pentanediol, 1,4-pentanediol, 1,2-hexanediol, 1,3-hexanediol, 1,4-hexanediol, 1,5-hexanediol, 1,3-heptandiol, 1,4-heptanediol, 1,5-heptanediol, 1,4-octanediol, 1,5-octanediol, 1,5-nonanediol. The 1,3-butanediol is particularly preferred.

The symmetric dicarboxylic acid or the symmetric dicarboxylic acid ester in step a) is a compound comprising at least two carboxylic function (acid or ester) and having preferably from 2 to 15 carbon atoms, more preferably from 4 to 10 carbon atoms. The term symmetric, as used herein with reference to any organic compound, means that the compound contains at least an axis or a plane of symmetry.

In a preferred aspect, the symmetric dicarboxylic acid or the symmetric dicarboxylic acid ester in step a) has general formula (II):

wherein $R_2$ can be an alkylene, preferably linear, or a cycloalkylene, or an arylene, having a number of carbon atoms comprised between 1 and 6 and $R_3$ can be H or a linear or branched $C_1$-$C_4$ alkyl.

In particular, when $R_2$ is a cycloalkylene or an arylene, the polyester obtained by the method of the present invention can have a peculiar structural rigidity which can cause an increase of the glass transition temperature $T_g$.

Specific examples of symmetric dicarboxylic acids particularly useful for the aim of the present invention are malonic acid (propanedioic acid), succinic acid (butanedioic acid), glutaric acid (pentanedioic acid), adipic acid (hexanedioic acid), 1,4-cyclohexanedioic acid (selected from the group consisting of trans 1,4-cyclohexanedioic acid, cis 1,4-cyclohexanedioic acid and mixtures thereof), terephthalic acid. Succinic acid and terephthalic acid are particularly preferred.

In a particularly preferred aspect the symmetric dicarboxylic acid is terephthalic acid.

Specific examples of symmetric dicarboxylic acid esters particularly useful for the aim of the present invention are ditnethylmalonate, diethylmalonate, dipropylmalonate, diisopropylmalonate, dibutylmalonate, diisobutylmalonate, di-t-butylmalonate, dimethyl succinate, diethylsuccinate, dipropylsuccinate, diisopropilsuccinate, dibutylsuccinate, diisobuthylsuccinate, di-t-buthylsuccinate, dimethylglutarate, diethylglutarate, diproprylglutarate, diisopropilglutarate, dibutylglutarate, diisobutylglutarate, di-t-butylglutarate, dimethyladipate, diethyladipate, dipropyladipate, diisopropiladipate, dibuthyladipate, diisobutyladipate, di-t-butyladipate, dimethyl-1,4-cyclohexanedioate, diethyl-1,4-cyclohexanedioate, dipropyl-1,4-cyclohexanedioato, diisopropyl-1,4-cyclohexanedioato, dibutyl-1,4-cyclohexanedioate, diisobutyl-1,4-cyclohexanedioato, di-t-butyl-1,4-cyclohexanedioate, dimethyl terephthalate, diethyl terephthalate, dipropylterephthalate, diisopropylterephthalate, dibutylterephthalate, diisobutylterephthalate, di-τ-butykerephthalate. Dimethyl succinate and diethyl terephthalate are particularly preferred.

In a preferred aspect of the invention, in step a) of the method the asymmetric diol comprising a primary alcohol function and a secondary alcohol function is the diol of general formula (I) and the symmetric dicarboxylic acid or a symmetric dicarboxylic acid ester is the symmetric dicarboxylic acid or the symmetric dicarboxylic acid ester of general formula (I).

In step a) of the method, the asymmetric diol and the symmetric dicarboxylic acid or symmetric dicarboxylic acid ester can be made to react in a molar ratio comprised between 2/1 and 3/1, and preferably in a molar ratio comprised between 2/1 and 2.5/1.

In a preferred aspect of the invention, the step a) of the method according to the present invention can comprise the two sub-steps of:
 a1) contacting an asymmetric diol comprising a primary alcohol function and a secondary alcohol function with a symmetric dicarboxylic acid, or a symmetric dicarboxylic ester, in a [diol]/[dicarboxylic acid or ester] molar ratio comprised between 1/1 and 1.5/1, in a reaction mixture comprising an enzymatic catalyst belonging to the category of the lipases, under stirring, and then
 a2) adding to said reaction mixture under stirring, a further amount of said asymmetric diol until a [diol]/[dicarboxylic acid or ester] molar ratio comprised between 2/1 and 3/1, and preferably comprised between 2/1 and 2.5/1 is achieved, thus obtaining a regioregular stable intermediate.

Said addition until at least the achievement of a molar ratio [diol]/[dicarboxylic acid or ester] comprised between 211 and 3/1, namely a molar ratio equal to or higher than the stoichiometric amount, can be carried out in a single solution or in different parts, equal or different from each other, preferably at regular time intervals.

The step a) of the method can be carried out under air or in inert atmosphere, and preferably it is carried out in inert atmosphere, for example, nitrogen, argon, helium, or mixture thereof.

Said step a) of the method can be conveniently carried out at a pressure comprised between 1 kPa and 150 kPa and preferably it is carried out at a pressure comprised between 2.5 kPa and 10 kPa.

For the aims of the present invention, atmospheric pressure means a pressure of about 101 kPa.

The step a) of the method can be carried out at a temperature comprised between 20° C. and 75° C., preferably between 40° C. and 70° C., even more preferably between 55° C. and 65° C.

The step a) of the method can be carried out for a time comprised between 1 hour and 72 hours, preferably between 2 and 48 hours.

In the embodiment wherein the step a) of the method comprises the two sub-steps a1) and a2), said sub-step a2) is carried out for a time corresponding to a percentage comprised between 50% and 99% of the time wherein the step a) of said method is carried out.

Said step a) of the method can be carried out "in mass", namely in the absence of solvents, or in at least one organic solvent, polar or non-polar, aromatic or non-aromatic, such as, for example, aliphatic saturated hydrocarbons, such as for example, pentane, hexane, heptane or mixtures thereof; cycloaliphatic hydrocarbons such as, for example, cyclopentane, cyclohexane, or mixtures thereof; aromatic hydrocarbons such as, for example, benzene, toluene, xylene, or mixtures thereof; aliphatic chlorinated hydrocarbons such as, for example, methylene chloride, chloroform, carbon tetrachloride, trichlorethylene, perchlorethylene, 1,2-dichloroethan or mixtures thereof; aromatic chlorinated hydrocarbons such as, for example, chlorobenzene, bromobenzene, chlorotoluene, or mixtures thereof; aliphatic or aromatic ethers such as, for example, diethyl ether, diphenyl ether, or mixtures thereof; aliphatic or aromatic ketones such as, for example acetone, methyl ethyl ketone, diisopropyl ketone, diphenylketone and mixtures thereof, ethyl acetate, acetonitrile.

In a preferred aspect, said organic solvent is selected from the group consisting of toluene, trichloromethane, diphenyl ether and mixtures thereof.

In a preferred aspect, the enzymatic catalyst belonging to the category of the lipases can be a lipase derived from a species of microorganisms belonging to the genus *Candida*, and even more preferably it is the lipase B of the species (*Candida antarctica*.

Preferably, the enzymatic catalyst belonging to the category of lipases can be immobilized on a solid support, comprising, for example, polymer matrixes, acrylic resins, microspheres of methacrylate copolymers, made of glass, or ceramic material, sodium alginate microcapsules, etcetera. In this way, said enzymatic catalyst can be recovered at the end of the esterification reaction of step a) of the present method, for example by filtration, and reused in subsequent esterification cycles.

The immobilization to the solid support can be carried out by adsorption, entrapment, cross-linking by covalent bonds or by non-covalent bonds which take advantage of the affinity of the enzymatic catalyst for particular functional groups present on said solid support.

Making the choice of the enzymatic catalyst belonging to the category of the lipases and the type of immobilization to the solid support of the enzymatic catalyst itself, which provides, for the several possible reaction substrates, used in step a) of the method according to the invention, the best yields of esterification, is within the reach of the person skilled in the art.

In a preferred aspect, the enzymatic catalyst used in step a) of the above-mentioned method is the lipase derived from the species *Candida antarctica*, immobilized on a solid support selected from acrylic resin and microspheres of methacrylate copolymers.

The regioregular stable intermediate obtained in step a) is a regioregular diester diol wherein the symmetric dicarboxylic acid or ester is esterified or transesterified with two molecules of said asymmetric diol by the primary alcohol functions and it has two free secondary hydroxyl groups.

In a preferred aspect of the invention, when in step a) the asymmetric diol of general formula (I) is reacted with the symmetric dicarboxylic acid or the symmetric dicarboxylic acid ester of general formula (II), the regioregular stable intermediate obtained at the end of step a) prevalently comprises diols of general formula (III):

(III)

wherein R, $R_1$ and $R_2$ have the meanings as previously described.

The high regioselectivity of the reaction of step a) of the method according to the invention was confirmed by subjecting the regioregular stable intermediate obtained from said step a) to $^1$H-NMR analysis, carried out by the nuclear magnetic resonance spectrometer mod. Bruker AC-400 Topspin with a resonance frequency of 400.13 MHz for $^1$H at the temperature of 300° K on a solution of regiospecific stable intermediate in deuterated chloroform or deuterated DMSO, having a concentration equal to 1% by weight with respect to the total weight of the solution and using the tetramethylsilane (TMS) signal as reference.

The instrumental parameters used for acquiring the $^1$H-NMR spectra are reported below:
  TD (time domain data size) (point number of FID. "free induction decay"): 16384;
  SW (spectral width): 5.99995 ppm;
  AQ (acquisition time): 3.412 s;
  D1 (relaxation time): 3.0 s;
  NS (scan n°): 64;
  O1P (centre of the spectral window): 3.0 ppm;
  P1 (impulse length): 9.0 μs;
  PLW1 (impulse power): 20.9 W.

The analysis was carried out according to the methods known to the person skilled in the art. In particular, the proton signal intensities in the closest position with respect to the ester groups on the dicarboxylic monomer unit (e.g., α-position for aromatic dicarboxylic units, like terephthalic ester monomer units, β-position for the aliphatic dicarboxylic units like succinic ester monomer units) are measured by $^1$H-NMR analysis and the relative ratio of the intensities of such signals, which are attributable to the magnetically non-equivalent protons of the possible different position isomers, is calculated.

Such ratio (defined as "regioregularity"), according to the previously given definition, can be calculated as follows:

$$Regioregularity(\%) = \frac{\Sigma I_{omo} - \Sigma I_{mix}}{\Sigma I_{omo} + \Sigma I_{mix}} \cdot 100$$

wherein $\Sigma I_{omo}$ is the summation of the intensity of the signals relating to protons of the dicarboxylic monomer unit in closest position with respect to the ester groups, attributable to structures wherein the dicarboxylic compound is esterified with two homologous alcohol functions (namely, 2 primary hydroxyl groups or 2 secondary hydroxyl groups), whereas $\Sigma I_{mix}$ is the summation of the intensity of the signals relating to protons of the dicarboxylic monomer unit in closest position with respect to the ester groups relating to structures in which the dicarboxylic compound is esterified with two different alcohol functions (namely, 1 primary hydroxyl group and 1 secondary hydroxyl group).

$^{13}$C-NMR based methods for the determination of regioregularity of polyesters are also available in the art (see, e.g., S. Munoz-Guerra et Al., Macromolecules, 2012, 45, p. 8261-8262).

Preferably, the regioregular stable intermediate obtained at the end of step a) of the method according to the present invention is characterized by a regioregularity which can be higher than or equal to 80% and preferably said regioregularity can be higher than or equal to 95%. In a particularly preferred aspect, said regioregularity is higher than or equal to 97% and lower than or equal to 100%. In this latter case, the regioregularity is also defined as "complete".

When the step a) of the present method is carried out by using an asymmetric diol comprising a chiral centre, based on the optical purity degree of said diol, the obtained regioregular stable intermediate can be in the enantiopure form, namely can be stereoregular, or in a mixture wherein an enantiomeric form (indifferently right-handed or left-handed) prevails on the other, or in the form of a racemic mixture of the two optical isomers.

The regioregular stable intermediate obtained in step a) of the method according to the present invention can be used as such for the polycondensation reaction of step b) of said method, or it can be preventively purified by any separation technique known to the person skilled in the art, for example by solvent precipitation, column or thin layer chromatography, solvent evaporation, filtration, etcetera, or by any combination of said separation techniques, in order to increase its regioregularity before reacting it according to step b) of the method of the present invention.

Specific examples of regioregular stable intermediates obtainable in the step a) of the method according to the present invention are: di-2-hydroxypropyl malonate, di-3-hydroxybutyl malonate, di-2-hydroxypentyl malonate, di-3-hydroxypentyl malonate, di-4-hydroxypentyl malonate, di-2-hydroxyhexyl malonate, di-3-hydroxyhexyl malonate, di-4-hydroxyhexyl malonate, di-5-hydroxyhexyl malonate, di-3-hydroxyheptyl malonate, di-4-hydroxyheptyl malonate, di-5-hydroxyheptyl malonate, di-4-hydroxyoctyl malonate, di-5-hydroxyoctyl malonate, di-5-hydroxynonyl malonate, di-2-hydroxypropyl succinate, di-3-hydroxybutyl succinate, di-2-hydroxypentyl succinate, di-3-hydroxypentyl succinate, di-4-hydroxypentyl succinate, di-2-hydroxyhexyl succinate, di-3-hydroxyhexyl succinate, di-4-hydroxyhexyl succinate, di-5-hydroxyhexyl succinate, di-3-hydroxyheptyl succinate, di-4-hydroxyheptyl succinate, di-5-hydroxyheptyl succinate, di-4-hydroxyoctyl succinate, di-5-hydroxyoctyl succinate, di-5-hydroxynonyl succinate, di-2-hydroxypropyl glutarate, di-3-hydroxybutyl glutarate, di-2-hydroxypentyl glutarate, di-3-hydroxypentyl glutarate, di-4-hydroxypentyl glutarate, di-2-hydroxyhexyl glutarate, di-3-hydroxyhexyl glutarate, di-4-hydroxyhexyl glutarate, di-5-hydroxyhexyl glutarate, di-3-hydroxyheptyl glutarate, di-4-hydroxyheptyl glutarate, di-5-hydroxyheptyl glutarate, di-4-hydroxyoctyl glutarate, di-5-hydroxyoctyl glutarate, di-5-hydroxynonyl glutarate, di-2-hydroxypropyl adipate, di-3-hydroxybutyl adipate, di-2-hydroxypentyl adipate, di-3-hydroxypentyl adipate, di-4-hydroxypentyl adipate, di-2- hydroxyhexyl adipate, di-3-hydroxyhexyl adipate, di-4-hydroxyhexyl adipate, di-5-hydroxyhexyl adipate, di-3-hydroxyheptyl adipate, di-4-hydroxyheptyl adipate, di-5-hydroxyheptyl adipate, di-4-hydroxyoctyl adipate, di-5-hydroxyoctyl adipate, di-5-hydroxynonyl adipate, di-2-hydroxypropyl-1,4-cyclohexanedioate, di-3-hydroxybutyl-1,4-cyclohexanedioate, di-2-hydroxypentyl-1,4-cyclohexanedioate, di-3-hydroxypentyl-1,4-cyclohexanedioate, di-4-hydroxypentyl-1,4-cyclohexanedioate, di-2-hydroxyhexyl-1,4-cyclohexanedioate, di-3-hydroxyhexyl-1,4-cyclohexanedioate, di-4-hydroxyhexyl-1,4-cyclohexanedioate, di-5-hydroxyhexyl-1,4-cyclohexanedioate, di-3-hydroxyheptyl-1,4-cyclohexanedioate, di-4-hydroxyheptyl-1,4-cyclohexanedioate, di-5-hydroxyheptyl-1,4-cyclohexanedioate, di-4-hydroxyoctyl-1,4-cyclohexanedioate, di-5-hydroxyoctyl-1,4-cyclohexanedioate, di-5-hydroxynonyl-1,4-cyclohexanedioate, di-2-hydroxypropyl terephthalate, di-3-hydroxybutyl terephthalate, di-2-hydroxypentyl terephthalate, di-3-hydroxypentyl terephthalate, di-4-hydroxypentyl terephthalate, di-2-hydroxyhexyl terephthalate, di-3-hydroxyhexylterephtbalate, di-4-hydroxyhexyl terephthalate, di-5-hydroxyhexyl terephthalate, di-3-hydroxyheptyl terephthalate, di-4-hydroxyheptyl terephthalate, di-5-hydroxyheptyl terephthalate, di-4-hydroxyoctyl terephthalate, di-5-hydroxyoctyl terephthalate, di-5-hydroxynonyl terephthalate. Di-3-hydroxybutyl succinate and di-3-hydroxybutyl terephthalate are particularly preferred.

The step b) of the method of the present invention is an irreversible acylation of the regioregular stable intermediate obtained in step a) of the above-mentioned method.

In the step b), said regioregular stable intermediate is reacted with a bifunctional, preferably symmetric, acylating agent.

In a preferred aspect of the invention, in the above-mentioned bifunctional acylating agent, the two acylating functions substantially have the same reactivity. Preferably the reactivity of the two acylating functions is such that to promote the acylation of the alcohol functions in very rapid periods of time, so as to avoid possible steric rearrangements in the obtained molecule of regioregular polyester, which can reduce the order of the structure of the same polyester.

In a preferred aspect, the above-mentioned, preferably symmetric, bifunctional acylating agent can be a diacyldihalide, namely a dihalide of a dicarboxylic acid.

In a particularly preferred aspect, said bifunctional acylating agent is a dichloride of a dicarboxylic acid, namely a diacyldichloride.

In a preferred aspect of the invention, said preferably symmetric acylating agent has general formula (IV):

(IV)

wherein X can be a halogen preferably selected from F, Cl and Br and preferably X is Cl, and $R_4$ can be an alkylene, preferably linear, or a cycloalkylene, or an arylene, with a number of carbon atoms comprised between 1 and 6.

Specific examples of bifunctional acylating agent particularly useful for the aim of the present invention can be: malonyl dichloride, succinyl dichloride, glutaryl dichloride, adipoyl dichloride, and terephthaloyl dichloride, 2-methyl-terephthaloyl dichloride. Succinyl dichloride and terephthaloyl dichloride are particularly preferred.

In a preferred aspect, in the step b) the molar ratio between regioregular stable intermediate and bifunctional acylating agent can be comprised between 0.5/1 and 2/1, more preferably said molar ratio is comprised between 0.75/1 and 1.5/1, even more preferably between 09/1 and 1/1.1. In a particularly preferred embodiment, said molar ratio is substantially 1.

In a preferred aspect, in the step b) of the above-mentioned method, according to a technique generally known in the art, the reaction between regioregular stable intermediate and bifunctional acylating agent can be carried out in the presence of a nitrogen organic base, for example a tertiary amine such as triethylamine or trimethylamine.

In particular, when the bifunctional acylating agent is a diacyldihalide, the function of said nitrogen organic base is to capture the acid product of condensation.

In a particularly preferred aspect, said nitrogen organic base is triethylamine.

The step b) of the method can be carried out under stirring, in the presence of air or under inert atmosphere, and preferably it is carried out under inert atmosphere, for example, nitrogen, argon, helium, or mixtures thereof.

Said step b) of the method can be carried out at a pressure comprised between 1 kPa and 150 kPa and preferably it is carried out at a pressure comprised between 2.5 kPa and 100 kPa.

In a preferred aspect, the step b) of the method can be carried out at a temperature comprised between 0° C. and 80° C., preferably between 10° C. and 75° C., even more preferably between 25° C. and 70° C.

In another preferred aspect, the step b) of the method can comprise the two sub-steps of:
  b1) contacting the stable intermediate obtained in step a) with a symmetric bifunctional acylating agent, at a temperature comprised between 0° C. and 20° C., and preferably between 5° C. and 10° C., thus obtaining a mixture;
  b2) bringing and maintaining said mixture at a temperature comprised between 20° C. and 80° C., and preferably between 25° C. and 70° C.

The subdivision of step b) in the two sub-steps b1) and b2) can advantageously avoid or limit the possible inconveniences of the irreversible acylation reaction such as the excessive reaction exothermicity, the uncontrolled development of gaseous halogenidric acid in case the bifunctional acylating agent is a diacyldihalide, the development of parasitic reactions and/or secondary reactions, which can be responsible for the decrease in terms of selectivity or the decrease of the molecular weights of the end-polymer.

Preferably, the step b) of the method is carried out for a time comprised between 1 hour and 8 hours, more preferably between 3 and 6 hours.

In the embodiment wherein the step b) of the method comprises the two sub-steps b1) and b2), said sub-step b2) is carried out for a time corresponding to a percentage comprised between 50% and 99% of the time in which the step b) of said method is carried out.

The step b) of the method can be preferably carried out in a polar or non-polar organic solvent, aromatic or non-aromatic, such as, for example, aliphatic saturated hydrocarbons such as, for example, pentane, hexane, heptane or mixtures thereof; cycloaliphatic hydrocarbons such as, for example, cyclopentane, cyclohexane, or mixtures thereof; aromatic hydrocarbons such as, for example, benzene, toluene, xylene, or mixtures thereof; aliphatic chlorinated hydrocarbons, such as for example, methylene chloride, chloroform, carbon tetrachloride, trichloroethylene, perchloroethylene, 1,2-dichloroethane or mixtures thereof; aromatic chlorinated hydrocarbons such as for example, chlorobenzene, bromobenzene, chlorotoluene, or mixtures thereof; aliphatic or aromatic ethers such as, for example, diethyl ether, diphenyl ether, or mixtures thereof; aliphatic or aromatic ketones such as for example, acetone, methyl ethyl ketone, diisopropyl ketone, diphenyl ketone and mixtures thereof, ethyl acetate, acetonitryl.

In a preferred aspect, the step b) can be carried out in an organic solvent selected from the group consisting of toluene, trichloromethane, diphenyl ether and mixtures thereof.

The regioregular polyester obtained at the end of step b) of the method according to the invention can be isolated and purified by any separation techniques known to the person skilled in the art, for example, by solvent precipitation, column or thin layer chromatography, solvent evaporation, filtration, etcetera, or by any combination of said separation techniques.

Therefore, it is a second object of the present invention the regioregular polyester obtainable by the method of the present invention.

When the regioregular stable intermediate is obtained from an asymmetric diol comprising a chiral center, depending on the optical purity degree of said diol, also the obtained regioregular polyester can be in the enantiopure form (namely it can be stereoregular) or in a mixture wherein an enantiomeric form (indifferently right-handed or left-handed) prevails on the other, or in the form of racemic mixture of the two optical isomers. In a particularly preferred aspect the regioregular polyester obtained by the method of the present invention is in the enantiopure form.

In a preferred aspect, said regioregular polyester has general formula (V):

(V)

wherein R, $R_1$, $R_2$ and $R_4$ have the meanings as described above.

In a preferred aspect, $R_2$ and $R_4$ are equal from each other.

The regioregular polyester obtained by the method of the present invention is characterized by $^1$H-NMR analysis as described above, in accordance with the methods known to the person skilled in the art.

As previously described, through this kind of analysis it is possible to determine the regioregularity of the polyester obtained, expressed as relative ratio of the signals relating to the protons of the dicarboxylic monomeric unit in α-position with respect to the ester groups attributable to the different position isomers through which the ester bonds can follow each other within the polymeric chain.

Said ratio is higher than 80%, and preferably higher than or equal to 95%. In a particularly preferred aspect, said ratio is higher than or equal to 97% and lower than or equal to 100%. In this latter case the regioregularity of the polyester is also defined as "complete".

On the regioregular polyester obtained by the method of the present invention it was also determined the glass transition temperature $T_g$ through Differential Scanning Calorimerry DSC by analysing 5-10 mg of regioregular polyester by a nitrogen-flow scanning differential calorimeter Perkin-Elmer DSC6, with heating ramps of 10° C./min up to 250° C. and cooling ramps of 20° C./min up to –100° C. The used analysis method is in accordance with the guidelines of the standard ISO 11357-1:1997 and ISO 11357-2:1999, known to the person skilled in the art.

Finally, in order to determine the molecular weight distribution of the regioregular polyesters obtained and the polydispersity index (in accordance with the IUPAC recommendation "Dispersity in polymer science" (2009), *Pure Appl. Chem.* vol. 81 pag. 351-353), the number average molecular mass values ($M_n$) and weight average molecular mass ($M_w$) values obtained by the Size-Exclusion Chromatography (SEC) analysis, carried out by the chromatography system Waters® Alliance 2695, equipped with a refractive index detector (RID) Waters® 410, were measured by using a Phenogel™ column bench (300×7.6 mm) of 5 μm, having a porosity of $10^6$, $10^5$, $10^4$, $10^3$ Å, in accordance with the methods known to the person skilled in the art.

During the analysis the following experimental conditions were used:
eluent: CHCl$_3$
flow: 1 mL/min
temperature: columns at 27° C., detector RID at 38° C.
injection volume: 200 μL
sample concentration: 25% by weight in CHCl$_3$,
internal standard: toluene The $M_n$ and $M_w$ values and the polydispersity index are obtained from a molecular weight calibration curve based on the elution volumes of standard samples of monodispersed polystyrene (PS) (Varian Inc.), having a molecular weight comprised between 1200 and 260800 Da.

The regioregular polyester obtained by the method of the present invention has a weight average molecular mass comprised between 5·10$^3$ and 5·10$^4$ Da.

In order to put the present invention into practice and better illustrate the same, some non-limiting examples are reported below.

Reagents and Base Materials
Acetonitrile Sigma-Aldrich 99.8%;
Hydrochloric acid Sigma-Aldrich 37%;
Succinic acid Sigma-Aldrich ≥99%;
Terephthalic acid Sigma-Aldrich 98%;
(±)-1,3-butanediol Sigma-Aldrich ≥99%;
Chloroform Sigma-Aldrich ≥99%;
Pure Dibutyltin oxide (DBTO) Merck Millipore;
Dichloromethane Sigma-Aldrich ≥99.8%;
Diethyl terephthalate Sigma-Aldrich 98%;
Diphenyl ether Sigma-Aldrich ≥99%
Dimethyl succinate Sigma-Aldrich 98%;
Dimethylterephthalate Acros Organics ≥99%;
Ethyl acetate Sigma-Aldrich 99.8%
Lipase B of *Candida antarctica* (CALB) immobilized on "Immobead 150" microspheres Sigma-Aldrich;
Lipase B of *Candida antarctica* (CALB) immobilized on the acrylic resin Novozyme 435 Aldrich;
Methanol Sigma-Aldrich 99.8%
Pure monobutyltin oxide (MBTO) Merck Millipore;
(R)-1,3-butanediol Sigma-Aldrich ≥98%
Succinyl chloride Sigma-Aldrich 95%;
Terephthaloyl chloride Sigma-Aldrich ≥99%;
Triethylamine Sigma-Aldrich ≥99%;
Toluene anhydrous Sigma-Aldrich 99.8%
In some cases, the above-mentioned reagents and solvents were further purified in order to increase their purity degree:

for this aim the traditional experimental method, such as for example, distillations or anhydrifications on molecular sieves, were used.

Example 1, According to the Invention (Synthesis and Isolation of the Regioregular Stable Intermediate Starting from an Asymmetric Diol and a Symmetric Aliphatic Dicarboxylic Compound in Solvent, in the Presence of Lipase B of *Candida antarctica*)

100 mmoles of dimethyl succinate and 300 mmoles of 1,3-butanediol with 50 mL of toluene are placed into a glass flask of 250 mL in the presence of lipase B of *Candida antarctica* immobilized on Immobead 150 (1% by weight with respect to dimethyl succinate). The reaction is carried out under inert atmosphere at 60° C. for 48 hours, under stirring.

By the $^1$H-NMR analysis, carried out on the crude reaction product, a conversion of the dimethyl succinate equal to 97.8% and a regioselectivity of esterification on the primary hydroxyl group of the 1,3-butanediol of 95.8% were determined (regioregularity of 91.6%).

The reaction mixture is filtered in order to remove the supported enzyme catalyst and washed with two portions of water (50 mL) for removing the excess of diol. The organic phase is anhydrified with anhydrous magnesium sulphate, filtered on a Büchner filter and subjected to evaporation of the solvent by rotary evaporator in order to isolate the regioregular stable intermediate.

Example 2, According to the Invention (Synthesis and Isolation of the Regioregular Stable Intermediate Starting from an Asymmetric Diol and a Symmetric Aliphatic Dicarboxylic Compound, in the Presence of Lipase B of *Candia antarctica*)

100 mmoles of dimethyl succinate and 200 mmoles of 1,3-butanediol are placed into a glass flask of 250 mL, in the presence of lipase B of *Candida antarctica* immobilized on Immobead 150 (1% by weight with respect to dimethyl succinate). The reaction is carried out under inert atmosphere at 60° C. for 20 hours, under stirring.

By the $^1$H-NMR analysis, carried out on the crude reaction product, a conversion of the dimethyl succinate equal to 96% and a regioselectivity of esterification on the primary hydroxyl group of the 1,3-butanediol of 80% were determined (regioregularity of 60%).

The crude reaction product is diluted 1:2 with dichloromethane, filtered to remove the supported enzyme catalyst, and washed with two portions of water (50 mL) for removing the excess of diol. The organic phase is anhydrified with anhydrous magnesium sulphate, filtered on a Büchner filter and brought to dryness by rotary evaporator in order to isolate the regioregular stable intermediate.

Example 3, According to the Invention (Synthesis and Isolation of the Regioregular Stable Intermediate Starting from an Asynunetric Diol and a Symmetric Aliphatic Dicarboxylic Compound, in the Presence of Ligase B of *Candida Antarctica* and Under Reduced Pressure Conditions)

100 mmoles of dimethyl succinate and 300 mmoles of 1,3-butanediol are placed into a glass flask of 250 mL, in the presence of lipase B of *Candida antarctica* immobilized on Immobead 150 (1% by weight with respect to dimethyl succinate). The reaction is carried out under reduced pressure (4.5 kPa) under inert atmosphere at 60° C. for 7 hours, under stirring.

By the $^1$H-NMR analysis, carried out on the crude reaction product, a conversion of the dimethyl succinate equal to 80% and a regioselectivity of esterification on the primary hydroxyl group of the 1,3-butanediol of 91% were determined (regioregularity of 82%).

The crude reaction product is diluted 1:2 with dichloromethane, filtered to remove the supported enzyme catalyst and washed with two portions of water (50 mL) for removing the excess of diol. The organic phase is anhydrified with anhydrous magnesium sulphate, filtered on a Büchner filter and brought to dryness by rotary evaporator in order to isolate the regioregular stable intermediate.

Example 4, Comparative (Synthesis Test of the Regioregular Stable Intermediate Starting from an Asymmetric Diol and a Symmetric Aliphatic Dicarboxylic Compound, in the Absence of Enzyme Catalyst)

10 mmoles of dimethyl succinate and 100 mmoles of 1,3-butanediol are placed into a glass flask of 250 mL. No enzyme catalyst is added to said mixture. The reaction is carried out under inert atmosphere at 120° C. for 2 hours, under stirring.

By the $^1$H-NMR analysis, carried out on the crude reaction product, no conversion of the dimethyl succinate is showed.

Example 5, Comparative (Synthesis Test of the Regioregular Stable Intermediate Starting from an Asymmetric Diol and a Symmetric Aliphatic Dicarboxylic Compound, in the Presence of MBTO Catalyst)

10 mmoles of dimethyl succinate and 100 mmoles of 1,3-butanediol are placed into a glass flask of 250 mL, in the presence of monobutyltin oxide (MBTO, 0.1 mmol). The reaction is carried out under inert atmosphere at 120° C. for 2 hours, under stirring.

By the $^1$H-NMR analysis, carried out on the crude reaction product, no conversion of the dimethyl succinate is showed.

Example 6, Comparative (Synthesis and Isolation of the Regioregular Stable Intermediate Starting from an Asymmetric Diol and a Symmetric Aliphatic Dicarboxylic Compound, in the Presence of DBTO Catalyst)

10 mmoles of dimethyl succinate and 100 mmoles of 1,3-butanediol are placed into a glass flask of 250 mL, in the presence of dibutyltin oxide (DBTO, 0.1 mmol). The reaction is carried out under inert atmosphere at 120° C. for 2 hours, under stirring.

By the $^1$H-NMR analysis, carried out on the crude reaction product, a conversion of the dimethyl succinate equal to 78% and a regioselectivity of esterification on the primary hydroxyl of the 1,3-butanediol of 70% were determined (regioregularity of 40%/6). Such regioselectivity value is considered to be not suitable for the aim of the method of the present invention.

Example 7, Comparative (Synthesis and Isolation of the Regioregular Stable Intermediate Starting from an Asymmetric Diol and a Symmetric Aliphatic Acyl Dichloride at Low Temperature)

100 mmoles of 1,3-butanediol in 50 mL of chloroform and 100 mmoles of triethylamine are placed into a glass flask of 250 ml equipped with a dropping funnel. The mixture is cooled and maintained at −40° C. into a bath of acetone and liquid nitrogen, then a solution consisting of 50 mmoles of succinyl chloride is added dropwise by using the dropping funnel in 50 mL of chloroform within 10 minutes. The reaction is carried out under inert atmosphere at a temperature of −40° C. for 40 minutes, then brought at room temperature for the following 4 hours under stirring. The obtained mixture is washed with a solution of HCl 1 M (50 mL), then with two portions of water (50 mL) for removing the amine and the possible non-reacted diol. The organic phase is anhydrified with anhydrous magnesium sulphate, filtered on a Büchner filter and brought to dryness by rotating evaporator.

By the $^1$H-NMR analysis, carried out on the organic phase, a conversion of the succinyl chloride equal to 100% and a regioselectivity of esterification on the primary hydroxyl of the 1,3-butanediol of 91% (regioregularity of 82%) was determined.

Although the intermediate has a suitable regioregularity, it is important to note that it was necessary to operate under particularly low temperature conditions.

Example 8, According to the Invention (Synthesis and Isolation of the Regioregular Stable Intermediate Starting from an Asymmetric Diol Added in Several Stages and a Symmetric Aromatic Dicarboxylic Compound, in the Presence of Ligase B of *Candida antarctica* and Under Reduced Pressure Conditions)

50 mmoles of diethyl terephthalate and 50 mmoles of 1,3-butanediol are placed into a glass flask of 250 ml, in the presence of lipase B of *Candida antarctica* immobilized on acrylic resin (1 g) and after one hour of reaction additional 50 mmoles of 1,3-butanediol are added. The reaction is carried out under reduced pressure (4.5 kPa) at 60° C. for overall 8 hours, under stirring. At the end, the reaction mixture is diluted 1:4 with chloroform; the obtained organic phase is then filtered to remove the supported enzyme catalyst and subjected to a washing with water (for three times) in order to remove the residual diol.

By the $^1$H-NMR analysis, carried out on the crude reaction mixture, a conversion of the dimethylterephthalate equal to 97.3% and a regioselectivity of esterification on the primary hydroxyl of the 1,3-butanediol of 100% (regioregularity of 100%) was determined.

The regioregular stable intermediate is isolated by thin layer chromatography, by using silica gel preparative plates and by elution in polarity gradient with chloroform and ethyl acetate mixed in a ratio comprised between 90:10 and 80:20.

Example 9, According to the Invention (Synthesis and Isolation of the Regioregular and Stereoregular Stable Intermediate Starting from an Enantiopure Asymmetric Diol Added in Several Stages and a Symmetric Aromatic Dicarboxylic Compound, in the Presence of Lipase B of *Candida antarctica* and Under Reduced Pressure Conditions)

Following the same process of example 8, a regioregular and stereoregular stable intermediate was prepared starting from enantiopure (R)-1,3-butanediol.

50 mmoles of diethyl terephthalate and 50 mmoles of (R)-1,3-butanediol are placed into a glass flask of 250 ml, in the presence of lipase B of *Candida antarctica* immobilized on acrylic resin (1 g) and after one hour of reaction additional 50 mmoles of (R)-1,3-butanediol are added. The reaction is carried out under reduced pressure (4.5 kPa) at 60° C. for overall 8 hours, under stirring. At the end, the reaction mixture is diluted 1:4 with chloroform; the obtained organic phase is then filtered to remove the supported enzyme catalyst and subjected to a washing with water (for three times) in order to remove the residual diol.

By the $^1$H-NMR analysis, carried out on the crude reaction mixture, a conversion of the diethylterephthalate equal to 97.3% and a regioselectivity of esterification on the primary hydroxyl of the 1,3-butanediol of 100% (regioregularity of 100%) was determined.

The regioregular stereoregular stable intermediate is isolated by thin layer chromatography, by using silica gel preparative plates and by elution in polarity gradient with chloroform and ethyl acetate mixed in a ratio comprised between 90:10 and 80:20.

Example 10, According to the Invention (Synthesis and Isolation of the Regioregular Stable Intermediate Starting from an Asymmetric Diol Added in Several Stages and a Symmetric Aromatic Dicarboxylic Compound, in the Presence of Lipase B of *Candida antarctica*)

50 mmoles of diethyl terephthalate and 50 mmoles of 1,3-butanediol are placed into a glass flask of 250 ml, in the presence of lipase B of *Candida antarctica* immobilized on acrylic resin (1 g) and after one hour of reaction additional 50 mmoles of 1,3-butanediol are added. The reaction is carried out under atmospheric pressure at 80° C. for overall 11 hours, under stirring. At the end, the reaction mixture is diluted 1:4 with chloroform; the obtained organic phase is then filtered to remove the supported enzyme catalyst and subjected to a washing with water (for three times) in order to remove the residual diol.

By the $^1$H-NMR analysis, carried out on the crude reaction mixture, a conversion of the diethylterephthalate equal to 49% and a regioselectivity of esterification on the primary hydroxyl of the 1,3-butanediol of 100% (regioregularity of 100%) was determined.

The regioregular stable intermediate is isolated by thin layer chromatography, by using silica gel preparative plates and by elution in polarity gradient with chloroform and ethyl acetate mixed in a ratio comprised between 90:10 and 80:20.

Example 11, Comparative (Synthesis Test of the Regioregular Stable Intermediate Starting from an Asymmetric Diol and a Symmetric Aromatic Dicarboxylic Compound, in the Absence of Enzyme Catalyst)

10 mmoles of terephthalic acid and 100 mmoles of 1,3-butanediol are placed into a glass flask of 250 ml. None enzyme catalyst is added to said mixture. The reaction is carried out under inert atmosphere at 180° C. for 3 hours, under stirring.

By the $^1$H-NMR analysis, carried out on the crude reaction product, no conversion of the terephthalic acid is showed.

Example 12, Comparative (Synthesis of the Regioregular Stable Intermediate Starting from an Asymmetric Diol and a Symmetric Aromatic Dicarboxylic Compound. In the Presence of MBTO Catalyst)

100 mmoles of terephthalic acid and 100 mmoles of 1,3-butanediol are placed into a glass flask of 250 ml, in the presence of monobutyltin oxide (MBTO, 0.1 mmol). The reaction is carried out under inert atmosphere at 180° C. for 3 hours, under stirring. By the $^1$H-NMR analysis, carried out on the crude reaction product, a conversion of the terephthalic acid equal to 70% and a regioselectivity of esterification on the primary hydroxyl of the 1,3-butanediol of 68% (regioregularity of 36%) were determined. Such regioselectivity value is considered to be not suitable for the aim of the method of the present invention.

Example 13, Comparative (Synthesis and Isolation of the Regioregular Stable Intermediate Starting from an Asymmetric Diol and a Symmetric Aromatic Acyl Dichloride at Low Temperature)

100 mmoles of 1,3-butanediol in 50 mL of chloroform and 100 mmoles of triethylamine are placed into a glass flask of 250 ml equipped with a dropping funnel. The mixture is cooled and maintained at −40° C. into a bath of acetone and liquid nitrogen, then a solution consisting of 50 mmoles of terephthaloyl chloride is added dropwise by using the dropping funnel in 50 mL of chloroform within 10 minutes. The reaction is carried out under inert atmosphere at a temperature of −40° C. for 40 minutes, then brought at room temperature for the following 4 hours under stirring. The obtained mixture is washed with a solution of HCl 1 M (50 mL), then with two portions of water (50 mL) for removing the amine and the possible non-reacted diol. The organic phase is anhydrified with anhydrous magnesium sulphate, filtered on a Büchner filter and brought to dryness by rotating evaporator.

By the $^1$H-NMR analysis, carried out on the organic phase, a conversion of the terephthaloyl chloride equal to 100% and a regioselectivity of esterification on the primary hydroxyl of the 1,3-butanediol of 95% was determined.

Although the intermediate has a suitable regioregularity, it is important to note that it was necessary to operate under particularly low temperature conditions and a much longer reaction time.

Example 14, According to the Invention (Synthesis of the Regioregular Polyester by Irreversible Polycondensation of the Regioregular Stable Intermediate with a Symmetric Aromatic Bifunctional Acylating Agent)

10 mmoles of terephthaloyl chloride, previously distilled, and 30 mL of anhydrous toluene are placed into a glass flask of 100 mL. A solution of 10 mmoles of regioregular stable intermediate, obtained as described in previous example 8, in 20 mL of anhydrous toluene, and containing also 60 mmoles of triethylamine, is added dropwise by a dropping funnel to this reaction mixture, which is maintained at 0° C. under stirring.

The reaction mixture is heated at 60° C. for an overall period of 6 hours.

At the end of the reaction, the obtained mixture is subjected to under vacuum evaporation. The residue is solubilized in chloroform and the obtained organic phase is washed for 2 times with solutions of HCl 2 M, for removing the triethylamine and then other 3 times with water. The organic phase is anhydrified with anhydrous magnesium sulphate, then methanol (about 10 mL/mL of organic phase) is added in order to allow the precipitation of the regioregular polyester at room temperature.

The regioregularity of the polyester obtained is confirmed by the $^1$H-NMR analysis, as previously described, and it proves to be complete (1000%).

In the $^1$H-NMR spectrum, reported in FIGS. 1A and 1B, two single signals ("singlets") of equal intensity which prove the existence of a symmetry within the polyester molecule are produced, namely, in other terms, they demonstrate that the ester bonds in each symmetric dicarboxylic unit relate either exclusively the primary alcohol function or exclusively the secondary alcohol function.

The weight average molecular weight of polyester is of $9 \cdot 10^3$ Da.

The obtained regioregular polyester was analysed by differential scanning calorimetry (DSC), as previously described, and the obtained profiles are reported in FIG. 3 (profiles b and c). The glass transition temperature $T_g$, was 45.1° C.; the same analysis showed the presence of an endothermic peak at 92.6° C., exclusively recorded in the first heating ramp, attributable to the melting of a crystalline phase.

Example 15, Comparative (Synthesis of the Statistical Polyester by Single Step Polycondensation of an Asymmetric Diol with a Symmetric Aromatic Dicarboxylic Compound, in the Presence of DBTO Catalyst)

10 mmoles of dimethyl terephthalate, 16 mmoles of 1,3-butanediol and 300 ppm of dibutyltin oxide (DBTO) are placed into a glass flask of 100 mL.

The reaction mixture is heated at 200° C. at room pressure for 2 hours under stirring, then placed at 230° C. under reduced pressure conditions (0.045 bar) for 3 hours.

At the end of the reaction, the residue is solubilized in chloroform, and methanol (about 10 mL/mL of organic phase) is added to the obtained solution in order to allow the precipitation of the polyester at room temperature.

The $^1$H-NMR analysis, carried out as previously described, allows to exclude the regioregularity of the polyester obtained.

In fact, in the $^1$H-NMR spectrum of the statistical polyester, represented in FIGS. 2A and 2B, it is possible to highlight the presence of a certain number of splatted signals ("doublets"), also including those attributable to the dicarboxylic units esterified with a primary alcohol function and a secondary alcohol function, in confirmation of the presence of non-symmetric sequences within the polymer chains.

The weight average molecular weight of the polyester is of $1.02 \cdot 10^4$ Da.

The statistical polyester obtained was analysed by differential scanning calorimetry (DSC), as previously described, and the obtained profiles are reported in FIG. 3 (profile a). The glass transition temperature $T_g$, was 39.4° C.; the same analysis did not highlight the presence of any endothermic peak attributable to the fusion of a crystalline phase, which confirms the completely amorphous nature of the obtained statistical polyester.

Example 16, in Accordance with the Invention
(Synthesis of the Stereoregular Regioregular
Polyester by Irreversible Polycondensation of a
Stereoregular Regioregular Stable Intermediate with
a Symmetric Aromatic Bifunctional Acylating
Agent)

10 mmoles of terephthaloyl chloride, previously distilled, and 30 mL of anhydrous toluene are placed into a glass flask of 100 mL. A solution of 10 mmoles of stereoregular regioregular stable intermediate, obtained as described in previous example 9, in 20 mL of anhydrous toluene, and containing also 60 mmoles of triethylamine, is added dropwise by a dropping funnel to this reaction mixture, which is maintained at 0° C. under stirring.

The preparation of the polyester was carried out according to the procedure described in previous example 14.

The regioregularity of the obtained polyester is confirmed by the $^1$H-NMR analysis, as previously described, and it proves to be complete (100%).

The weight average molecular weight of the stereoregular regioregular polyester is of $8.6\cdot 10^3$ Da.

The obtained stereoregular regioregular polyester was analysed by a differential scanning calorimetry (DSC), as previously described, and the obtained profiles are reported in FIG. 3 (profiles d and e). The glass transition temperature $T_g$, was 51.8° C.; the same analysis showed the presence of two endothermal peaks at 89.6° C. and 111° C., exclusively recorded in the first heating ramp, attributable to the melting of several polymorphic crystalline phases.

Finally, it is to be intended that further modifications and variations, which follow within the scope of the appended claims, can be made to the process herein described and illustrated.

The invention claimed is:

1. A method of synthesis of a regioregular polyester, comprising:
   (a) reacting under stirring an asymmetric diol comprising a primary alcohol function and a secondary alcohol function with a symmetric dicarboxylic acid, or a symmetric dicarboxylic acid ester, in the presence of an enzymatic catalyst belonging to the category of the lipases, thus obtaining a regioregular stable intermediate; and
   (b) reacting the regioregular stable intermediate obtained in the reacting (a) with a bifunctional acylating agent, thus obtaining the regioregular polyester.

2. The method of claim 1, wherein the regioregular polyester has a regioregularity of at least 80%.

3. The method of claim 1, wherein the regioregular stable intermediate in the reacting (a) has a regioregularity of at least 80%.

4. The method of claim 1, wherein the regioregular stable intermediate in the reacting (a) has a regioregularity of 100% and each carboxylic function of the symmetric dicarboxylic acid, or of the symmetric dicarboxylic ester, is bound by ester bonds to the primary alcohol function of the asymmetric diol.

5. The method of claim 1, wherein the asymmetric diol has formula (I):

(I)

wherein
R is a $C_1$-$C_4$ alkylene, and
$R_1$ is a $C_1$-$C_4$ alkyl.

6. The method of claim 1, wherein the symmetric dicarboxylic acid or the symmetric dicarboxylic acid ester has formula (II):

(II)

wherein
$R_2$ is an alkylene, or a cycloalkylene, or an arylene, comprising a number of carbon atoms in a range of from 1 to 6, and
$R_3$ is H or a linear or branched $C_1$-$C_4$ alkyl.

7. The method of claim 1, wherein the asymmetric diol and the symmetric dicarboxylic acid or the symmetric dicarboxylic acid ester in the reacting (a) are made to react in a molar ratio in a range of from 2/1 to 3/1.

8. The method of claim 1, wherein the reacting (a) comprises:
   (a1) contacting the asymmetric diol, in a [diol]/[dicarboxylic acid or ester] molar ratio in a range of from 1/1 to 1.5/1, in a reaction mixture comprising an enzymatic catalyst belonging to the category of the lipases, under stirring, and then
   (a2) adding to the reaction mixture under stirring, a further amount of the asymmetric diol until a [diol]/[dicarboxylic acid or ester] molar ratio in a range of from 2/1 to 3/1, is achieved, thus obtaining a regioregular stable intermediate.

9. The method of claim 1, wherein the reacting (a) is carried out
under air or inert atmosphere, and/or
at a pressure in a range of from 1 to 150 kPa, and/or
at a temperature in a range of from 20 to 75° C., and/or
for a time in a range of from 1 to 72 hours.

10. The method of claim 1, wherein the enzymatic catalyst is a lipase derived from species of microorganisms belonging to the *Candida* genus.

11. The method of claim 1, wherein the bifunctional acylating agent is a dihalide of a dicarboxylic acid.

12. The method of claim 1, wherein the bifunctional acylating agent has formula (IV):

(IV)

wherein
X is a halogen, and
$R_4$ is an alkylene, a cycloalkylene, or an arylene, with a number of carbon atoms being in a range of from 1 to 6.

13. The method of claim 1, wherein the bifunctional acylating agent is symmetric.

14. The method of claim 1, wherein in the reacting (b) the molar ratio between regioregular stable intermediate and bifunctional acylating agent is in a range of from 0.5/1 to 2/1.

15. The method of claim 1, wherein the reacting (b) between regioregular stable intermediate and bifunctional acylating agent is carried out in the presence of a nitrogen organic base.

16. The method of claim 1, wherein the reacting (b) is carried out under air or inert atmosphere, and/or
at a pressure in a range of from 1 to 150 kPa, and/or
for a time in a range of from 1 to 8 hours, and/or
at a temperature in a range of from 0 to 80° C.

17. The method of claim 1, wherein the reacting (b) comprises:
  (b1) contacting the stable intermediate obtained in the reacting (a) with a symmetric bifunctional acylating agent, at a temperature in a range of from 0 to 20° C., thus obtaining a mixture;
  (b2) bringing and maintaining the mixture at a temperature in a range of from 20 to 80° C.

18. A regioregular polyester, obtained by the method according to claim 1,
  wherein the polyester comprises, in reacted form:
  the asymmetric diol; and
  the symmetric dicarboxylic acid or ester, and
  wherein the regioregular polyester has a regioregularity of at least 50%.

19. A stereoregular regioregular polyester, obtained by the method according to claim 1,
  wherein the polyester comprises, in reacted form:
  the asymmetric diol; and
  the symmetric dicarboxylic acid or ester, and
  wherein the regioregular polyester has a regioregularity of at least 50%.

20. The polyester of claim 18, comprising a repeating unit of formula (V):

wherein
R is a $C_1$-$C_4$ alkylene
$R_1$ is a $C_1$-$C_4$ alkyl, and
$R_2$ and $R_4$ are independently an alkylene, a cycloalkylene, or an arylene, with a number of carbon atoms in a range of from 1 to 6.

* * * * *